(12) United States Patent
Hosoi et al.

(10) Patent No.: US 12,451,793 B2
(45) Date of Patent: Oct. 21, 2025

(54) CHARGING SYSTEM

(71) Applicant: Panasonic Intellectual Property Management Co., Ltd., Osaka (JP)

(72) Inventors: Hiroyuki Hosoi, Osaka (JP); Atsushi Seki, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 260 days.

(21) Appl. No.: 18/166,287

(22) Filed: Feb. 8, 2023

(65) Prior Publication Data

US 2023/0268818 A1 Aug. 24, 2023

(30) Foreign Application Priority Data

Feb. 24, 2022 (JP) ................................ 2022-027241

(51) Int. Cl.
*H02M 7/219* (2006.01)
*H02J 7/02* (2016.01)
(Continued)

(52) U.S. Cl.
CPC ............. *H02M 1/0048* (2021.05); *H02J 7/02* (2013.01); *H02M 1/08* (2013.01); *H02M 3/01* (2021.05);
(Continued)

(58) Field of Classification Search
CPC ........ H02M 1/0048; H02M 1/08; H02M 3/01; H02M 3/33573; H02M 7/219;
(Continued)

(56) References Cited

U.S. PATENT DOCUMENTS 6,459,175 B1\* 10/2002 Potega .................... B60L 53/11
307/132 M
10,727,687 B2\* 7/2020 Zhang ....................... H02J 7/04
(Continued)

FOREIGN PATENT DOCUMENTS

| JP | 2015119616 A | 6/2015 |
| JP | 6024209 B2 | 11/2016 |
| WO | 2020049801 A1 | 3/2020 |

OTHER PUBLICATIONS

Notice of Reasons for Refusal, dated Aug. 19, 2025, for Japanese Patent Application No. 2022-027241. (5 pages) (with English Translation).

*Primary Examiner* — Kyle J Moody
(74) *Attorney, Agent, or Firm* — Seed Intellectual Property Law Group LLP

(57) ABSTRACT

A charging system according to the present disclosure includes an AC-DC converter, a DC-DC converter, and a control circuit. The AC-DC converter is connected between an input node and an intermediate node. The AC-DC converter is connectable to a power source via the input node. The DC-DC converter is connected between the intermediate node and an output node. The DC-DC converter is connectable to a battery via the output node. The control circuit is configured to control a voltage of the intermediate node so as to reduce a sum of a loss in the AC-DC converter and a loss in the DC-DC converter, in accordance with a first parameter, a second parameter, and a third parameter. The first parameter is related to input power of the AC-DC converter. The second parameter is related to output power of the DC-DC converter. The third parameter is related to an ambient temperature.

4 Claims, 12 Drawing Sheets

(51) Int. Cl.
  *H02M 1/00*   (2006.01)
  *H02M 1/08*   (2006.01)
  *H02M 3/00*   (2006.01)
  *H02M 3/335*  (2006.01)

(52) U.S. Cl.
  CPC ....... *H02M 3/33573* (2021.05); *H02M 7/219* (2013.01); *H02J 2207/20* (2020.01)

(58) Field of Classification Search
  CPC ........... H02M 1/0025; H02M 3/33569; H02M 7/217; H02J 7/02; H02J 2207/20; H02J 7/04; H02J 2310/48; H02J 7/007; H02J 7/007182; B60L 53/20; B60L 53/31
  See application file for complete search history.

(56) References Cited

U.S. PATENT DOCUMENTS

| | | | |
|---|---|---|---|
| 11,349,325 B2* | 5/2022 | Hung | .................. H02J 7/00309 |
| 2015/0171740 A1 | 6/2015 | Seong et al. | |
| 2017/0085098 A1* | 3/2017 | Sporck | .............. H02J 7/007194 |
| 2018/0370369 A1 | 12/2018 | Jang et al. | |
| 2019/0348849 A1* | 11/2019 | Kun | ....................... H02M 3/158 |
| 2021/0313870 A1 | 10/2021 | Iwabuki et al. | |

\* cited by examiner

CHARGING SYSTEM

CROSS-REFERENCE TO RELATED APPLICATIONS

This application is based upon and claims the benefit of priority from Japanese Patent Application No. 2022-027241, filed on Feb. 24, 2022, the entire contents of which are incorporated herein by reference.

FIELD

The present disclosure relates to a charging system.

BACKGROUND

Charging systems connected between an alternating current (AC) power source and a battery convert AC power received from the AC power source into direct current (DC) power, and charge the battery with the DC power (for example, see Japanese Patent No. 6024209).

In charging systems, a power loss may occur when AC power is converted into DC power and/or when DC power is converted into other DC power.

The present disclosure provides a charging system capable of substantially preventing a power loss.

SUMMARY

A charging system according to the present disclosure includes an AC-DC converter, a DC-DC converter, and a control circuit. The AC-DC converter is connected between an input node and an intermediate node. The AC-DC converter is connectable to a power source via the input node. The DC-DC converter is connected between the intermediate node and an output node. The DC-DC converter is connectable to a battery via the output node. The control circuit is configured to control a voltage of the intermediate node so as to reduce a sum of a loss in the AC-DC converter and a loss in the DC-DC converter, in accordance with a first parameter, a second parameter, and a third parameter. The first parameter is related to input power of the AC-DC converter. The second parameter is related to output power of the DC-DC converter. The third parameter is related to an ambient temperature.

DETAILED DESCRIPTION

Hereinafter, embodiments of a charging system according to the present disclosure will be described with reference to the drawings.

Embodiments

Figure 1:
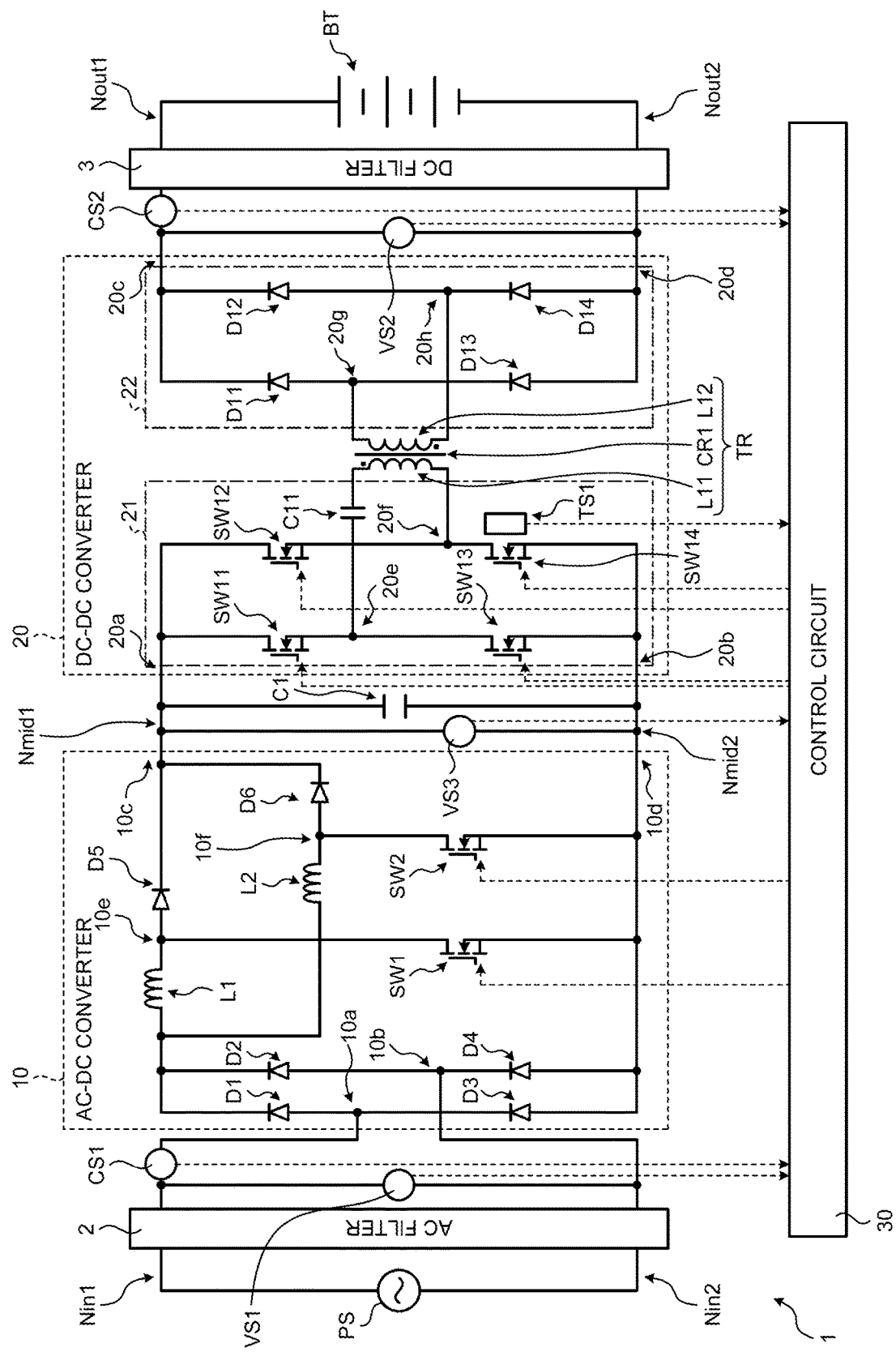
FIG. 1 is a circuit diagram illustrating a charging system according to an embodiment.

The charging system according to an embodiment is connected between an AC power source and a battery and configured to convert AC power from the AC power source into DC power and then convert the DC power into other DC power to charge the battery. The charging system is designed so as to substantially preventing a power loss during the above-mentioned conversions. For example, a charging system 1 can be configured as illustrated in FIG. 1. FIG. 1 is a circuit diagram illustrating the charging system 1.

The charging system 1 is connected between an AC power source PS and a battery BT. The charging system 1 includes an AC-DC converter 10, a DC-DC converter 20, and a control circuit 30. The DC-DC converter 20 may be an LLC converter. Under the control of the control circuit 30, the charging system 1 converts an AC voltage Vin received from the AC power source PS into a DC voltage Vsub while raising the AC voltage Vin with the AC-DC converter 10, and then converts the DC voltage Vsub resulting from the conversion into a DC voltage Vout for charging while raising and lowering the DC voltage Vsub with the DC-DC converter 20, and charges the DC voltage Vout into the battery BT. For example, the charging system 1 may be an on-board charger mounted on an electric or hybrid vehicle, the AC power source PS may be a power system of a home or a charging station, and the battery BT may be a vehicle-mounted battery. The level of the AC voltage Vin may vary depending on a destination of the charging system 1. The level of the DC voltage Vout may vary depending on the state of charge of the battery BT.

In the charging system 1, an input node Nin1 is connected to one end of the AC power source PS, meanwhile an input node Nin2 is connected to the other end of the AC power source PS. In the charging system 1, an output node Nout1 is connected to the cathode of the battery BT meanwhile an output node Nout2 is connected to the anode of battery BT.

In the charging system 1, the power loss may vary depending on temperature. Therefore, based on the input power of the AC-DC converter 10, the output power of the DC-DC converter 20, and an ambient temperature, the control circuit 30 performs control so that the sum of a loss in the AC-DC converter 10 and a loss in the DC-DC converter 20 is smaller than the sum of current losses. With this control, the charging system 1 can substantially prevent a power loss and thereby efficiently convert AC power into DC power and convert the DC power to other DC power.

In addition to the AC-DC converter 10, the DC-DC converter 20, and the control circuit 30, the charging system 1 further includes an AC filter 2, a capacitive element C1, a DC filter 3, voltage sensors VS1 to VS3, current sensors CS1, CS2, and a temperature sensor TS1.

The AC filter 2 is connected between the input nodes Nin1, Nin2 and the AC-DC converter 10. One end of the AC filter 2 is connected between the input node Nin1 and an input node 10*a* of the AC-DC converter 10, meanwhile the other end of the AC filter 2 is connected between the input node Nin2 and an input node 10*b* of the AC-DC converter 10. When a noise component flows from the AC-DC converter 10, the AC filter 2 filters the noise component for attenuation. Thus, the AC filter 2 can prevent the noise component from flowing from the AC-DC converter 10 to the AC power source PS.

The AC-DC converter 10 is connected between the input nodes Nin1, Nin2 and the intermediate nodes Nmid1, Nmid2. The AC-DC converter 10 can be connected to the AC power source PS via the input nodes Nin1, Nin2. The AC-DC converter 10 is connected between the AC filter 2 and the intermediate nodes Nmid1, Nmid2. The AC-DC converter uses a power factor correction (PFC) circuit to convert AC power into DC power while improving the power factor of AC power.

The AC-DC converter 10 includes a plurality of rectifiers D1 to D6, a plurality of inductive elements L1, L2, and a plurality of switching elements SW1, SW2, as a PFC circuit, for example. The rectifiers D1 to D4 are bridge-connected to constitute a bridge circuit. In this configuration, after the full-wave rectification of AC voltage in the bridge circuit, energy is repeatedly stored in and released to the inductive elements L1, L2 by switching operations of the switching elements SW1, SW2, and, in response to the repeated storage and release, currents are repeatedly stopped and injected into the capacitive element C1 via the rectifiers D5, D6. Thus, the AC-DC converter 10 can generate the DC output voltage Vsub while making the phase of the AC current closer to the phase of the AC voltage, and thereby improve the power factor.

The rectifier D1 performs rectification in the direction from the input node 10*a* to an output node 10*c*. The rectifier D1 is, for example, a diode having an anode connected to the input node 10*a* and a cathode connected to the output node 10*c* via the inductive element L1 and the rectifier D5.

The rectifier D2 performs rectification in the direction from the input node 10*b* to the output node 10*c*. The rectifier D2 is, for example, a diode having an anode connected to the input node 10*b* and a cathode connected to the output node 10*c* via the inductive element L1 and the rectifier D5.

The rectifier D3 performs rectification in the direction from an output node 10*d* to the input node 10*a*. The rectifier D3 is, for example, a diode having an anode connected to the output node 10*d* and a cathode connected to the input node 10*a*.

The rectifier D4 performs rectification in the direction from the output node 10*d* to the input node 10*b*. The rectifier D4 is, for example, a diode having an anode connected to the output node 10 and a cathode connected to the input node 10*bd*.

Between the rectifiers D1, D2 and the output node 10*c*, a series connection of the inductive elements L1 and the rectifier D5 and a series connection of the inductive element L2 and the rectifier D6 are connected in parallel. The switching element SW1 is connected between a node 10*e* between the inductive element L1 and the rectifier D5 and the output node 10*d*. The switching element SW2 is connected between a node 10*f* between the inductive element L2 and the rectifier D6 and the output node 10*d*.

The inductive element L1 is connected between the rectifiers D1, D2 and the node 10*e*. The inductive element L1 is, for example, a coil having one end connected to the rectifiers D1, D2 and the other end connected to the node 10*e*. The inductive element L1 can contribute to improving the power factor of the AC-DC converter 10 by storing and releasing electromagnetic energy.

The rectifier D5 performs rectification in the direction from the node 10*e* to the output node 10*c*. The rectifier D5 is, for example, a diode having an anode connected to the node 10*e* and a cathode connected to the output node 10*c*.

The inductive element L2 is connected between the rectifiers D1, D2 and the node 10*f*. The inductive element L2 is, for example, a coil having one end connected to the rectifiers D1, D2 and the other end connected to the node 10*f*. The inductive element L2 can contribute to improving the power factor of the AC-DC converter 10 by storing and releasing electromagnetic energy.

The rectifier D6 performs rectification in the direction from the node 10*f* to the output node 10*c*. The rectifier D6 is, for example, a diode having an anode connected to the node 10*f* and a cathode connected to output node 10*c*.

The switching element SW1 is connected between the node 10*e* and the rectifiers D3, D4. The switching element SW1 makes or breaks electrical connections between the node 10*e* and the rectifiers D3, D4 in accordance with a control signal from the control circuit 30. The switching element SW1 is, for example, an N-channel MOSFET transistor having a source connected to the rectifiers D3, D4, a drain connected to the node 10*e*, and a gate connected to the control circuit 30.

When receiving an active-level control signal from the control circuit 30 at the gate, the switching element SW1 turns on to make electrical connections between the node 10*e* and the rectifiers D3, D4. When receiving a non-active-level control signal from the control circuit 30 at the gate, the switching element SW1 turns off to break the electrical connections between the node 10*e* and the rectifiers D3, D4.

The switching element SW2 is connected between the node 10*f* and the rectifiers D3, D4. The switching element SW2 makes or breaks electrical connections between the node 10*f* and the rectifiers D3, D4 in accordance with a control signal from the control circuit 30. The switching element SW2 is, for example, an N-channel MOSFET transistor having a source connected to the rectifiers D3, D4, a drain connected to the node 10*f*, and a gate connected to the control circuit 30.

When receiving an active-level control signal from the control circuit 30 at the gate, the switching element SW2 turns on to make electrical connections between the node 10*f* and the rectifiers D3, D4. When receiving a non-active-level control signal from the control circuit 30 at the gate, the switching element SW2 turns off to break the electrical connections between the node 10*f* and the rectifiers D3, D4.

The capacitive element C1 is connected between the AC-DC converter 10 and the DC-DC converter 20. The capacitive element C1 is, for example, a smoothing capacitor, such as an aluminum electrolytic capacitor, a film capacitor, or a ceramic capacitor, having one end connected to the intermediate node Nmid1 and the other end connected to the intermediate node Nmid2. By performing electrical discharge and charge, the capacitive element C1 can contribute to improving the power factor of the AC-DC converter 10 and generate the DC voltage Vsub.

The DC-DC converter 20 is, for example, an LLC converter. The DC-DC converter 20 is connected between the intermediate nodes Nmid1, Nmid2 and the output nodes Nout1, Nout2. The DC-DC converter 20 can be connected to the battery BT via the output nodes Nout1, Nout2. The DC-DC converter 20 is connected between the intermediate nodes Nmid1, Nmid2 and the DC filter 3. In the DC-DC converter 20, an isolation transformer TR is used to convert DC power into DC power for charging while performing insulation separation between an input side (a primary side) and an output side (a secondary side).

The DC-DC converter 20 includes, for example, a primary-side circuit 21, the isolation transformer TR, and a secondary-side circuit 22. The primary-side circuit 21 includes a plurality of switching elements SW11 to SW14 and a capacitive element C11. The isolation transformer TR includes a primary winding L11, a secondary winding L12, and a core CR1. The secondary-side circuit 22 includes a plurality of rectifiers D11 to D14.

The switching element SW11 is connected between an input node 20*a* and a node 20*e*. The switching element SW11 makes or breaks electrical connections between the input node 20*a* and the node 20*e* in accordance with a control signal from the control circuit 30. The switching element SW11 is, for example, an N-channel MOSFET transistor having a source connected to the node 20*e*, a drain connected to the input node 20*a*, and a gate connected to the control circuit 30.

When receiving an active-level control signal from the control circuit 30 at the gate, the switching element SW11 turns on to make an electrical connection between the input node 20*a* and the node 20*e*. When receiving a non-active-level control signal from the control circuit 30 at the gate, the switching element SW11 turns off to break the electrical connection between the input node 20*a* and the node 20*e*.

The switching element SW12 is connected between the input node 20*a* and a node 20*f*. The switching element SW12 makes or breaks an electrical connection between the input node 20*a* and the node 20*f* in accordance with a control signal from the control circuit 30. The switching element SW12 is, for example, an N-channel MOSFET transistor having a source connected to the node 20*f*, a drain connected to the input node 20*a*, and a gate connected to the control circuit 30.

When receiving an active-level control signal from the control circuit 30 at the gate, the switching element SW12 turns on to make an electrical connection between the input node 20*a* and the node 20*f*. When receiving a non-active-level control signal from the control circuit 30 at the gate, the switching element SW12 turns off to break the electrical connection between the input node 20*a* and the node 20*f*.

The switching element SW13 is connected between the node 20*e* and an input node 20*b*. The switching element SW13 makes or breaks an electrical connection between the node 20*e* and the input node 20*b* in accordance with a control signal from the control circuit 30. The switching element SW13 is, for example, an N-channel MOSFET transistor having a source connected to the input node 20*b*, a drain connected to the node 20*e*, and a gate connected to the control circuit 30.

When receiving an active-level control signal from the control circuit 30 at the gate, the switching element SW13 turns on to make an electrical connection between the node 20*e* and the input node 20*b*. When receiving a non-active-level control signal from the control circuit 30 at the gate, the switching element SW13 turns off to break the electrical connection between the node 20*e* and the input node 20*b*.

The switching element SW14 is connected between the node 20*f* and the input node 20*b*. The switching element SW14 makes or breaks the electrical connection between the node 20*f* and the input node 20*b* in accordance with the control signal from the control circuit 30. The switching element SW14 is, for example, an N-channel MOSFET transistor having a source connected to the input node 20*b*, a drain connected to the node 20*f*, and a gate connected to the control circuit 30.

When receiving an active-level control signal from the control circuit 30 at the gate, the switching element SW14 turns on to make an electrical connection between the node 20*f* and the input node 20*b*. When receiving a non-active-level control signal from the control circuit 30 at the gate, the switching element SW14 turns off to break the electrical connection between the node 20*f* and the input node 20*b*.

Note that, on the assumption that each of the switching elements SW1, SW2, SW11 to SW14 is an N-channel MOSFET transistor, the electrodes of the transistor are described as the drain, the gate, and the source, but, in the case where each of the switching elements SW1, SW2, SW11 to SW14 is an insulated gate bipolar transistor (IGBT), the drain can be read as a collector and the source can be read as an emitter.

The capacitive element C11 is connected between the node 20*e* and the primary winding L11. One end of the capacitive element C11 is connected to the node 20*e*, meanwhile the other end of the capacitive element C11 is connected one end of the primary winding L11. The capacitive element C11 can reduce a switching loss caused by the switching elements SW11 to SW14, by performing a resonant operation together with the primary winding L11.

In the isolation transformer TR, the primary winding L11 is electrically insulated from the secondary winding L12 and magnetically coupled to the secondary winding L12 via a core CR1. The isolation transformer TR can be configured as a flyback transformer. As indicated with • in FIG. 1, the primary winding L11 and the secondary winding L12 are wound in directions opposite to each other with respect to a path through which a line of magnetic force in the core CR1 passes. The isolation transformer TR may be configured without the core CR1 as long as the primary winding L11 is magnetically coupled to the secondary winding L12.

One end of the primary winding L11 is connected to the node 20*e* via the capacitive element C11, meanwhile the other end of the primary winding L11 is connected to the node 20*f*. One end of the secondary winding L12 is connected to a node 20*g*, meanwhile the other end of the secondary winding L12 is connected to a node 20*h*.

The rectifier D11 performs rectification in the direction from a node 20*g* to an output node 20*c*. The rectifier D11 is, for example, a diode having an anode connected to the node 20*g* and a cathode connected to the output node 20*c*.

The rectifier D12 performs rectification in the direction from the node 20*f* to the output node 20*c*. The rectifier D12 is, for example, a diode having an anode connected to the node 20*f* and a cathode connected to the output node 20*c*.

The rectifier D13 performs rectification in the direction from an output node 20*d* to the node 20*g*. The rectifier D13 is, for example, a diode having an anode connected to the output node 20*d* and a cathode connected to the node 20*g*.

The rectifier D14 performs rectification in the direction from the output node 20*d* to the node 20*h*. The rectifier D14 is, for example, a diode having an anode connected to the output node 20*d* and a cathode connected to the node 20*h*.

The DC filter 3 is connected between the DC-DC converter 20 and the output nodes Nout1, Nout2. One end of the DC filter 3 is connected between the DC-DC converter 20 and the output node Nout1, meanwhile the other end of the DC filter 3 is connected between the DC-DC converter 20 and the output node Nout2. The DC filter 3 filters DC power supplied from the DC-DC converter 20 and supplies the DC power to the battery BT. Thus, the DC filter 3 can reduce noise contained The voltage sensor VS1 detects the input voltage Vin of the charging system 1. The voltage sensor VS1 detects a voltage between the input node 10*a* and the input node 10*b* as the input voltage Vin. The voltage sensor VS1 supplies the detected input voltage Vin to the control circuit 30.

The voltage sensor VS2 detects the output voltage Vout of the charging system 1. The voltage sensor VS2 detects a voltage between the output node 20*c* and the output node 20*d* as the output voltage Vout. The voltage sensor VS2 supplies the detected output voltage Vout to the control circuit 30.

The voltage sensor VS3 detects the intermediate voltage Vsub of the charging system 1. The voltage sensor VS3 detects a voltage between the intermediate node Nmid1 and the intermediate node Nmid2 as the intermediate voltage Vsub. The voltage sensor VS3 supplies the detected intermediate voltage Vsub to the control circuit 30.

The current sensor CS1 detects an input current Iin of the charging system 1. The current sensor CS1 detects a current flowing between the input node Nin1 and the input node 10*a* as the input current Iin. The current sensor CS1 supplies the detected input current Iin to the control circuit 30.

The current sensor CS2 detects an output current Tout of the charging system 1. The current sensor CS2 detects a current flowing between the output node 20*c* and the output node Nout1 as the output current Tout. The current sensor CS2 supplies the detected output current Tout to the control circuit 30.

Figure 2:
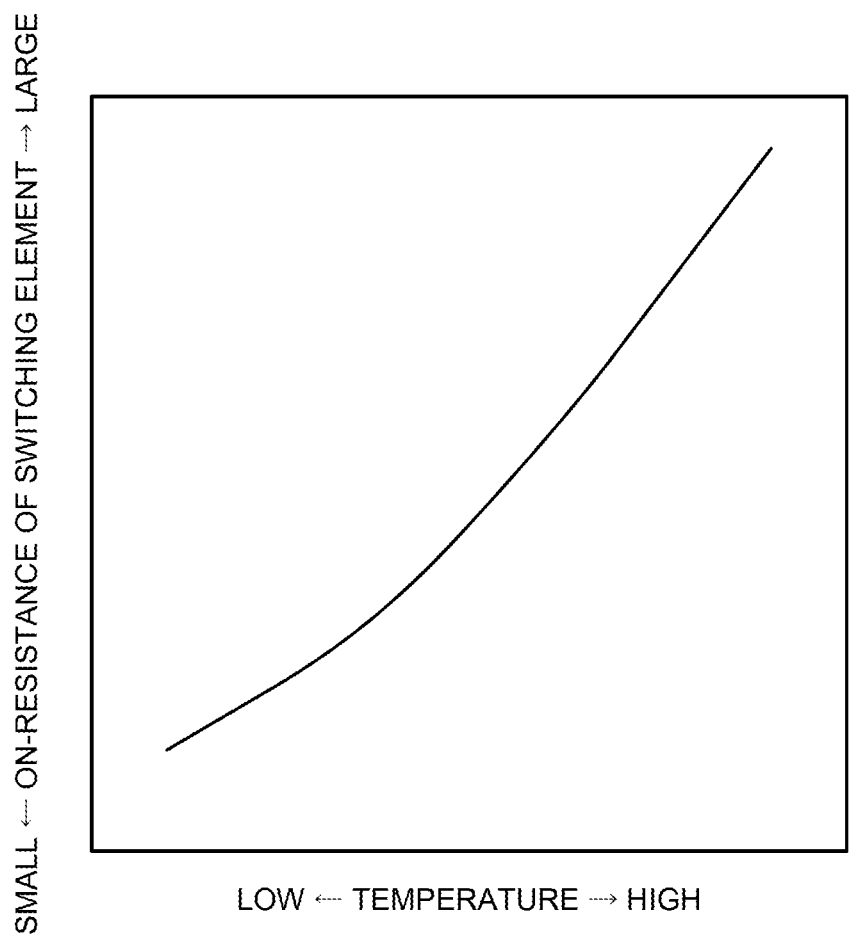
FIG. 2 is a diagram illustrating the temperature dependence of the on-resistance of a switching element in the embodiment.

Here, each of the switching elements SW11 to SW14 has a temperature dependence as a characteristic related to power loss. For example, the on-resistance of each of the switching elements SW11 to SW14 can vary depending on ambient temperature as illustrated in FIG. 2. FIG. 2 is a diagram illustrating the temperature dependence of the on-resistance of the switching elements SW11 to SW14. In FIG. 2, a tendency for the on-resistance of each of the switching elements SW11 to SW14 to increase with an increase in ambient temperature is illustrated as the temperature dependence of the on-resistance.

Therefore, the temperature sensor TS1 detects the ambient temperature of the charging system 1. The temperature sensor TS1 may detect a temperature near the switching elements SW11 to SW14 as the ambient temperature of the charging system 1. For example, the temperature sensor TS1 may be mounted on a substrate on which the switching elements SW11 to SW14 are mounted, or may be attached to a surface of a package in the case where the switching elements SW11 to SW14 are sealed in the package.

The number of the temperature sensors TS1 to be mounted may be one or more. For example, one temperature sensor TS1 may be mounted on a substrate on which the switching elements SW11 to SW14 are mounted, or may be attached to a surface of any one of the packages of the switching elements SW11 to SW14. A plurality of temperature sensors TS1 may be distributed at several locations on the substrate on which the switching elements SW11 to SW14 are mounted, or may be attached to a surface of each of the switching elements SW11 to SW14.

In addition to a first parameter related to the input power of the AC-DC converter and a second parameter related to the output power of the DC-DC converter 20, the control circuit 30 acquires a third parameter related to the ambient temperature. The charging system 1 controls voltages Vsub of the intermediate nodes Nmid1, Nmid2 so that the sum of a loss in the AC-DC converter 10 and a loss in the DC-DC converter 20 is smaller than the sum of current losses, in accordance with the first, second, and third parameters. In other words, the control circuit 30 determines target values of the voltages Vsub of the intermediate nodes Nmid1, Nmid2. The charging system 1 controls the switching elements in the AC-DC converter 10 so that the voltages Vsub of the intermediate nodes Nmid1, Nmid2 reach the determined target values. With this control, the charging system 1 can substantially prevent a power loss and thereby efficiently convert AC power into DC power and convert the DC power to other DC power.

Figure 3:
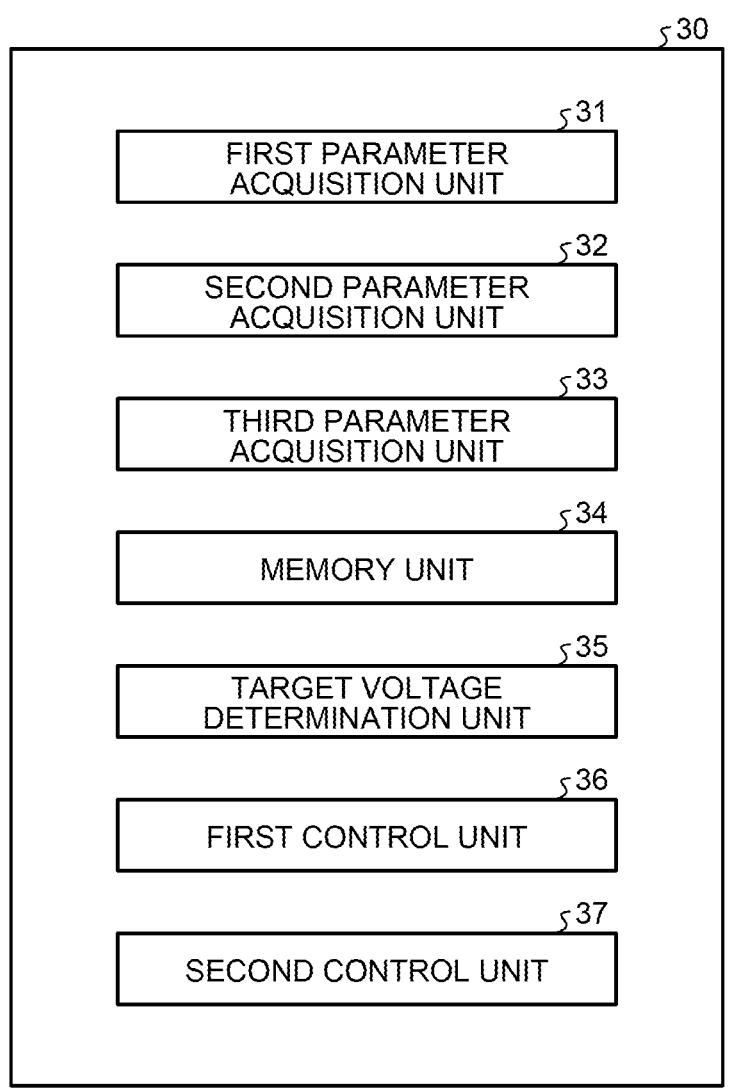
FIG. 3 is a diagram illustrating the functional configuration of a control circuit in the embodiment.

For example, the control circuit 30 can be configured as illustrated in FIG. 3. FIG. 3 is a diagram illustrating the functional configuration of the control circuit 30. The functional constituents illustrated in FIG. 3 may be implemented as software or hardware, or some of the functional constituents may be implemented as software and the rest thereof may be implemented as hardware.

The control circuit 30 includes a first parameter acquisition unit 31, a second parameter acquisition unit 32, a third parameter acquisition unit 33, a target voltage determination unit 35, a first control unit 36, and a second control unit 37.

The first parameter acquisition unit 31 acquires the first parameter. The first parameter is a parameter related to the input power of the AC-DC converter 10. The first parameter may be the input voltage Vin of the AC-DC converter 10, the input current Iin of the AC-DC converter 10, or the input power of the AC-DC converter 10 (=Effective value of Vin×Effective value of Iin).

The second parameter acquisition unit 32 acquires the second parameter. The second parameter is a parameter related to the output power of the DC-DC converter 20. The second parameter may be the output voltage Vout of the DC-DC converter 20, the output current Iout of the DC-DC converter 20, or the output power of the DC-DC converter 20 (=Effective value of Vout×Effective value of Iout).

The third parameter acquisition unit 33 acquires the third parameter. The third parameter is a parameter related to an ambient temperature. The third parameter may be a temperature near the switching elements SW11 to SW14.

A memory unit 34 stores correspondence information 341. The correspondence information 341 is such that the first parameter, the second parameter, the third parameter, the sum of losses, and the voltages Vsub of the intermediate nodes are associated with a plurality of voltage values of the intermediate nodes. The correspondence information 341 may be implemented in a table format or in an equation format.

Figure 4:
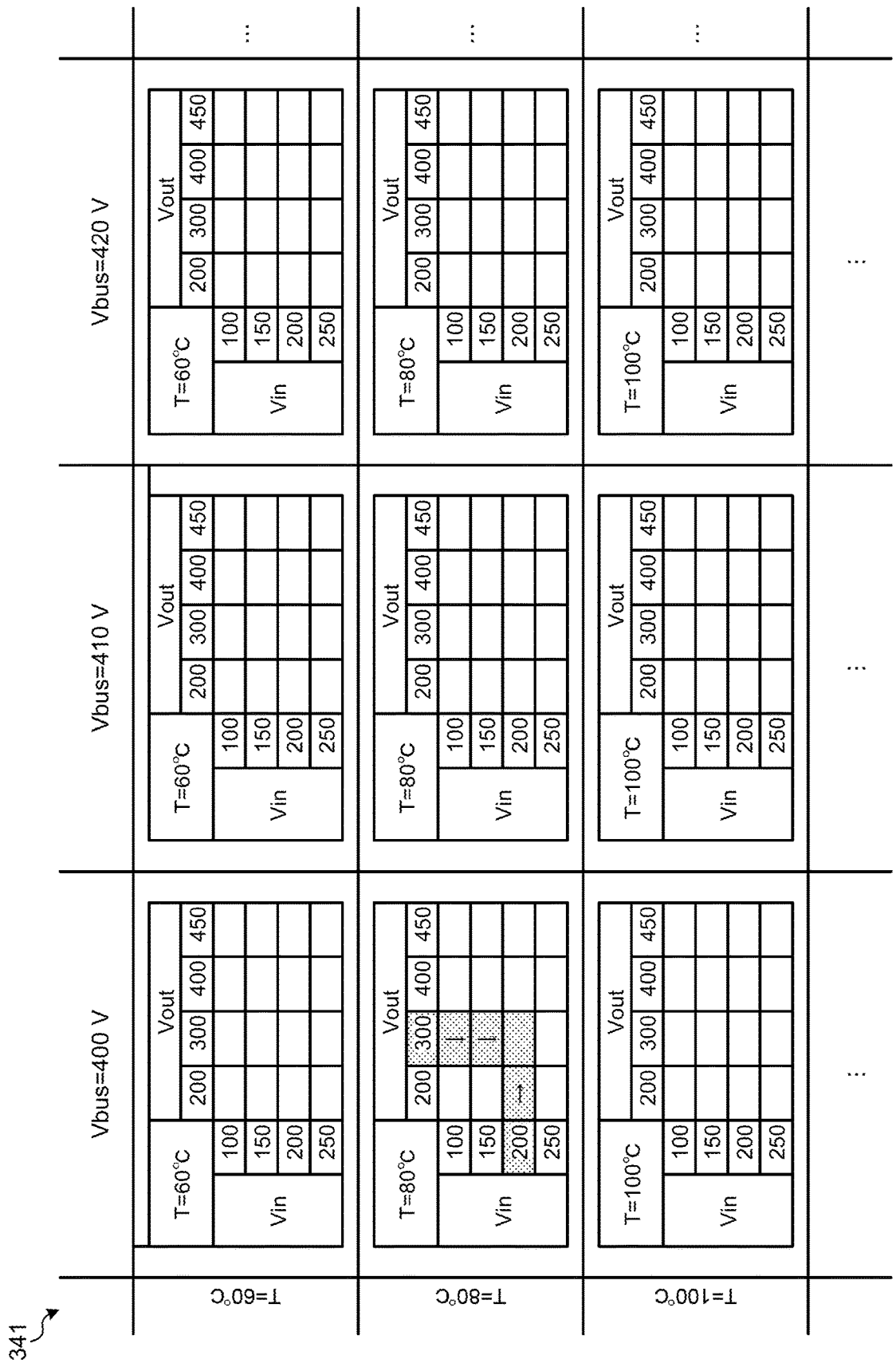
FIG. 4 is a diagram illustrating the data structure of correspondence information in the embodiment.

For example, the memory unit 34 may have the correspondence information 341 as illustrated in FIG. 4. FIG. 4 is a diagram illustrating the data structure of the correspondence information 341. In FIG. 4, there is illustrated a case in which the first parameter is the input voltage Vin of the AC-DC converter 10, the second parameter is the output voltage Vout of the DC-DC converter 20, and the third parameter is a temperature T near the switching elements SW11 to SW14. In FIG. 4, the correspondence information 341 is illustrated as information with a hierarchical structure. That is, pieces of information at the same temperature T are arranged in the row direction, meanwhile pieces of information at different temperatures T are arranged in the column direction. Pieces of information at the voltage value of the same voltage Vsub are arranged in the column direction, meanwhile pieces of information at different voltage values are arranged in the row direction. In an area enclosed by a square identified by a combination of the temperature T and the voltage Vsub, pieces of information on power loss at the same input voltage Vin are arranged in the row direction, meanwhile pieces of information on power loss at different input voltages Vin are arranged in the column direction. Pieces of information on power loss at the same output voltage Vout are arranged in the column direction, meanwhile pieces of information on power loss at different output voltages Vout are arranged in the row direction. The information on power loss is such that the sum of a power loss in the AC-DC converter 10 and a power loss in the DC-DC converter 20 is experimentally determined in advance under various conditions and recorded.

Note that the data structure of the correspondence information 341 is not limited to the structure illustrated in FIG. 4, but may be another data structure as long as the first parameter, the second parameter, the third parameter, the sum of losses, and the voltages Vsub of the intermediate nodes are associated with a plurality of voltage values of the intermediate nodes.

The target voltage determination unit 35 receives the first parameter from the first parameter acquisition unit 31, receives the second parameter from the second parameter acquisition unit 32, and receives the third parameter from the third parameter acquisition unit 33. The target voltage determination unit 35 determines target values of the voltages Vsub of the intermediate nodes Nmid1, Nmid2 so that the sum of a loss in the AC-DC converter 10 and a loss in the DC-DC converter 20 is smaller (for example, the minimum) than the sum of current losses, in accordance with the first parameter, the second parameter, and the third parameter.

The target voltage determination unit 35 accesses the memory unit 34 and refers to the correspondence information 341 to determine the sum of a loss in the AC-DC converter and a loss in the DC-DC converter 20 at the present time (the sum of current losses). The target voltage determination unit 35 may determine the target values of the voltages Vsub at the intermediate nodes Nmid1, Nmid2 so that the sum of a loss in the AC-DC converter 10 and a loss in the DC-DC converter 20 is smaller (for example, the minimum) than the sum of current losses. In the case where the sum of losses corresponding to the acquired first parameter, the acquired second parameter, and the acquired third parameter in the correspondence information 341 includes a plurality of sums, the target voltage determination unit 35 identifies the sum of losses that is smaller than the sum of current losses (for example, the minimum) among the plurality of sums of losses. The target voltage determination unit 35 determines the voltage value of the intermediate node corresponding to the identified sum of the losses, to be a target value of the voltage Vsub.

For example, when the input voltage Vin=200 V, the output voltage Vout=300 V, and the temperature T=80° C., it is assumed that the sums of losses PL1, PL2, and PL3 respectively corresponding to the voltages Vsub=400 V, 410 V, and 420 V are identified by referring to the correspondence information 341 illustrated in FIG. 4. At this time, the target voltage determination unit 35 compares magnitude among the sums of the losses PL1, PL2, and PL3. If a result of the comparison is

PL1<PL2<PL3 and the current voltage Vsub=410 V, the target voltage determination unit 35 identifies PL2 as the sum of the current losses. In this case, PL1 is smaller than PL2, and accordingly the target value of the voltage Vsub is determined to be 400 V, which corresponds to the sum of losses PL1. If the current voltage Vsub=420 V, the sum of the current losses is PL3. In this case, PL1 and PL2 are smaller than PL3, and accordingly the target value of the voltage Vsub may be determined to be 400 V, which corresponds to the sum of losses PL1, or may be determined to be 410 V, which corresponds to the sum of losses PL2.

Referring back to FIG. 3, the target voltage determination unit 35 supplies the target value of the voltage Vsub to the first control unit 36 and the second control unit 37.

The first control unit 36 receives the target value of the voltage Vsub (for example, 400 V) from the target voltage determination unit 35. The first control unit 36 controls the switching elements SW1, SW2 of the AC-DC converter 10 in accordance with the target value of the voltage Vsub. The first control unit 36 causes the switching elements SW1, SW2 to perform switching operation with a gate signal adjusted, for example, by modulation with a frequency and/or a pulse width in accordance with the target value of the voltage Vsub. Thus, the control circuit 30 can control the AC-DC converter 10 so that the AC-DC converter 10 receives the AC voltage Vin and outputs the DC voltage Vsub at a level corresponding to the target value.

The second control unit 37 receives the target value of the voltage Vsub (for example, 400 V) from the target voltage determination unit 35. The second control unit 37 controls the switching elements SW11 to SW14 of the DC-DC converter 20 in accordance with the target value of the voltage Vsub. The second control unit 37 causes the switching elements SW11 to SW14 to perform switching operation with a gate signal adjusted, for example, by modulation with a frequency and/or a pulse width in accordance with the target value of the voltage Vsub. Thus, the control circuit 30 can control the DC-DC converter 20 so that the DC-DC converter 20 receives the DC voltage Vsub at a level corresponding to the target value and outputs the DC voltage Vout for charging.

As described above, in the charging system 1, in accordance with the first parameter related to the input power Vin, the second parameter related to the output power Vout, and the third parameter related to the ambient temperature T, the control circuit 30 controls the voltage Vsub of the intermediate node so that the sum of a loss in the AC-DC converter 10 and a loss in the DC-DC converter 20 is smaller (for example, the minimum) than the sum of current losses. In other words, the control circuit 30 determines the target value of the voltage Vsub of the intermediate node. The control circuit 30 controls the switching elements SW1, SW2 in the AC-DC converter 10 so that the voltage Vsub of the intermediate node reaches the target value. With this control, the charging system 1 can substantially prevent a power loss and thereby efficiently convert AC power into DC power and convert the DC power to other DC power. Thus, the number of heat-radiating members in the charging system 1 can be reduced, whereby the charging system 1 can be made less expensive and smaller in size.

Note that, considering that more parameters basically lead to higher accuracy, the control circuit 30 may acquire two or more of the input power, the input voltage, and the input current of the AC-DC converter 10 as the first parameter. The control circuit 30 may acquire two or more of the output power, the output voltage, and the output current of the DC-DC converter 20 as the second parameter. In response to this, the correspondence information 341 may be further layered. Alternatively, in the case where more parameters lead to a larger table and thereby cause an insufficient capacity of the control circuit 30, an approximate formula using the data may be given to the control circuit 30 so that the voltage Vbus is determined by calculation using an observed value.

The temperature sensor TS1 may detect a temperature near the switching elements SW1, SW2 as the ambient temperature of the charging system 1, in place of or in addition to a temperature near the switching elements SW11 to SW14.

Alternatively, as the ambient temperature of a charging system 1i, a temperature near other elements whose characteristics related to a power loss have temperature dependence may be further considered.

Figure 5:
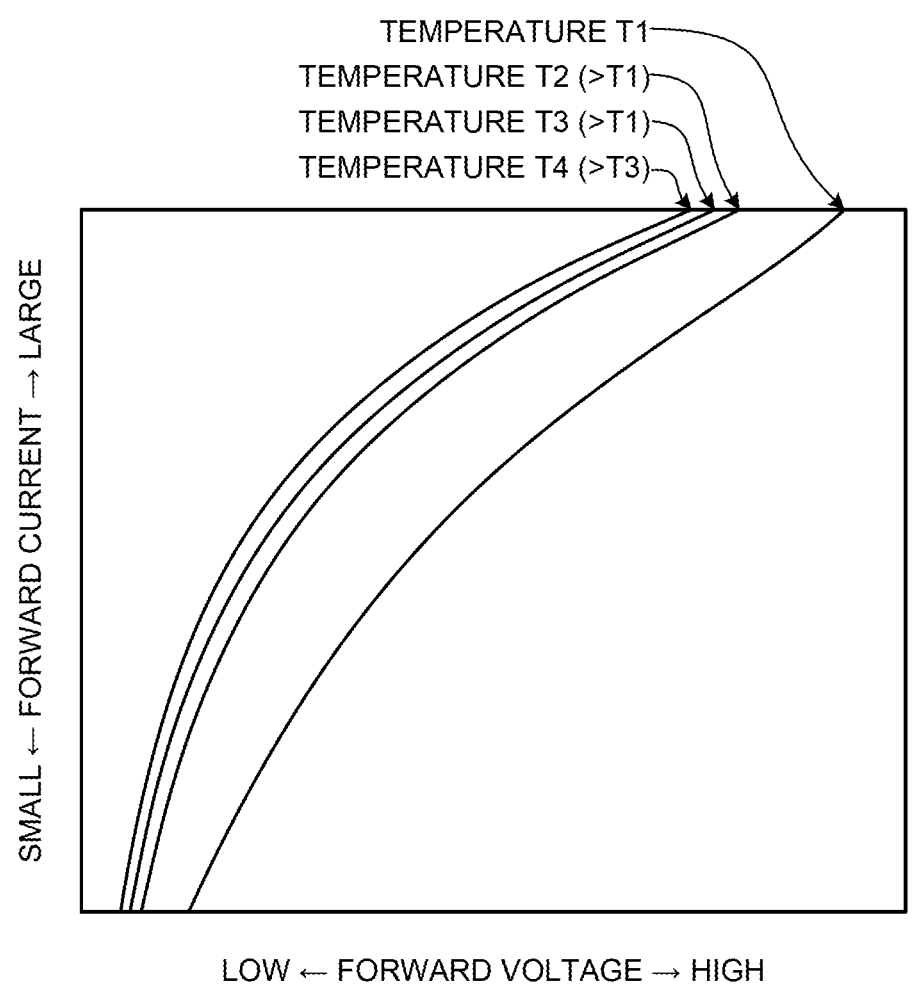
FIG. 5 is a diagram illustrating the temperature dependence of the voltage-current characteristics of a rectifier in the embodiment.

For example, the voltage-current characteristics of the rectifiers D5, D6 may vary with the ambient temperature as illustrated in FIG. 5. FIG. 5 is a diagram illustrating the temperature dependence of the voltage-current characteristics of the rectifiers D1 to D4. In FIG. 5, there is illustrated a tendency for the characteristics of forward voltages and forward currents of the rectifiers D1 to D4 to shift to the upper left in FIG. 5 as the temperatures T1, T2, T3, and T4 increase in this order. In other words, there is illustrated a tendency for the "on-resistance" of the rectifiers D1 to D4="forward voltage"/"forward current" to decrease and for the forward voltages of the rectifiers D1 to D4 to decrease as the temperatures T1, T2, T3, and T4 increase in this order.

Figure 6:
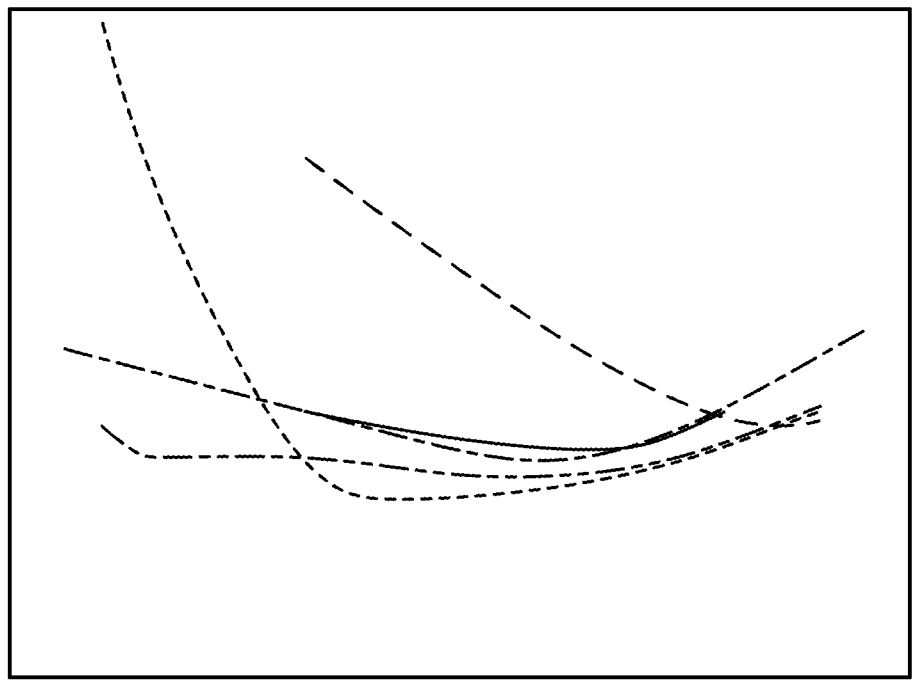
FIG. 6 is a diagram illustrating the temperature dependence of a core loss of an isolation transformer in the embodiment.

The loss of the core CR1 in the isolation transformer TR may vary with the ambient temperature as illustrated in FIG. 6. FIG. 6 is a diagram illustrating the temperature dependence of the core loss in the isolation transformer TR. The isolation transformer TR converts electrical energy into magnetic energy at the primary winding L11, transfers the magnetic energy to the secondary winding L12 via the core CR1, and converts the magnetic energy into electrical energy at the secondary winding L12. An energy loss occurs when the magnetic energy is transferred through the core CR1. In FIG. 6, the temperature dependences of a plurality of different core members are illustrated. In the case of a core member indicated by a long-dashed line, there is illustrated a tendency for a core loss to decrease as the temperature increases. In the case of core members indicated by a short-dashed line, a dot-dash line, and a dot-dot-dash line, there is illustrated a tendency for a core loss to decrease once and then increase as the temperature increases. The different core members have different temperatures at which the core loss is the minimum. Note that the loss of each of the core members can be reduced by lowering a voltage applied to the primary winding L11.

Figure 7:
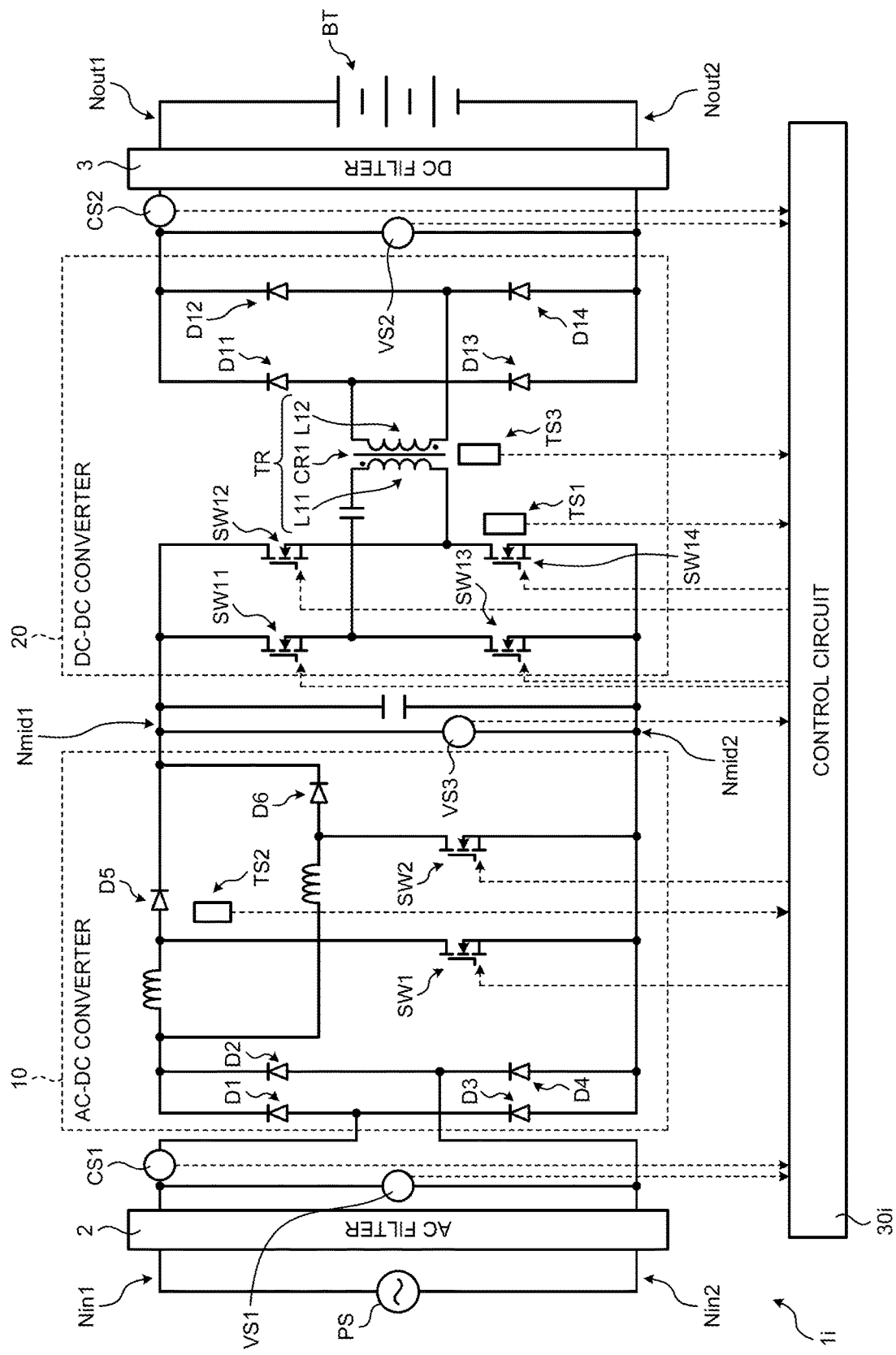
FIG. 7 is a circuit diagram illustrating the configuration of a charging system according to a first modification of the embodiment.

As a first modification of the embodiment, in consideration of the temperature dependences illustrated in FIG. 2, FIG. 5, and FIG. 6, the charging system 1i may further include temperature sensors TS2, TS3 as illustrated in FIG. 7. FIG. 7 is a circuit diagram illustrating the configuration of the charging system 1i according to the first modification of the embodiment. The temperature sensor TS2 may detect a temperature near the rectifiers D5, D6 as the ambient temperature of the charging system 1i. The temperature sensor TS3 may detect a temperature near the core CR1 of the isolation transformer TR as the ambient temperature of the charging system 1i.

Here, the third parameter acquisition unit 33 in a control circuit 30i may determine the ambient temperature by weighted-averaging temperatures detected by the temperature sensors TS1, TS2, and TS3. For example, it is assumed that W1 is the influence of a temperature near switching elements SW11 to SW14 on power loss, W2 is the influence of a temperature near the rectifiers D1 to D4 on power loss, and W3 is the influence of a temperature near the core CR1 of the isolation transformer TR on power loss. Furthermore, assuming that temperatures detected by the temperature sensors TS1, TS2, and TS3 are TS1, TS2, and TS3, respectively, the third parameter acquisition unit 33 can determine the ambient temperature T as the third parameter by the following Equation 1.

$$T=(W1 \times TS1+W2 \times TS2+W3 \times TS3)/(W1+W2+W3) \qquad \text{Equation 1}$$

Thus, in consideration of a temperature near the elements, the control circuit 30i can control the voltages Vsub of the intermediate nodes Nmid1, Nmid2 so that the sum of a loss in the AC-DC converter 10 and a loss in the DC-DC converter 20 is smaller (for example, the minimum) than the sum of current losses. Thus, the voltages Vsub can be more precisely controlled so that the sum of a loss in the AC-DC converter 10 and a loss in the DC-DC converter 20 is smaller (for example, the minimum) than the sum of current losses.

Note that the temperature sensor TS1 may detect a temperature near the switching elements SW1, SW2 as the ambient temperature of the charging system 1i, in place of or in addition to the temperature near the switching elements SW11 to SW14. The temperature sensor TS2 may detect a temperature near the rectifiers D1 to D4, D11 to D14 as the ambient temperature of charging system 1i, in place of or in addition to the temperature near the rectifiers D5, D6.

Alternatively, as a second modification of the embodiment, a charging system 1j may monitor the first parameter and the second parameter to calculate system efficiency, and dynamically control the voltage Vbus so as to achieve the maximum system efficiency. That is, operations (mainly, duty ratio control) of the AC-DC converter 10 may be adjusted to control the voltage Vbus in accordance with a circuit condition.

For example, an operation condition (frequency or duty ratio) of the DC-DC converter 20 disposed downstream of the AC-DC converter 10 is uniquely determined by the Vbus, the output voltage of the storage battery BT, and the output current to be charged (load condition). Therefore, as in the hill-climbing method, immediately preceding efficiency may be compared with immediately following efficiency, and whether or not the efficiency is approaching the maximum may be determined based on a result of the comparison, and the operation condition (for example, frequency or duty ratio) of the switching elements SW1, SW2 may be adjusted in a direction in which the efficiency increases.

Figure 8:
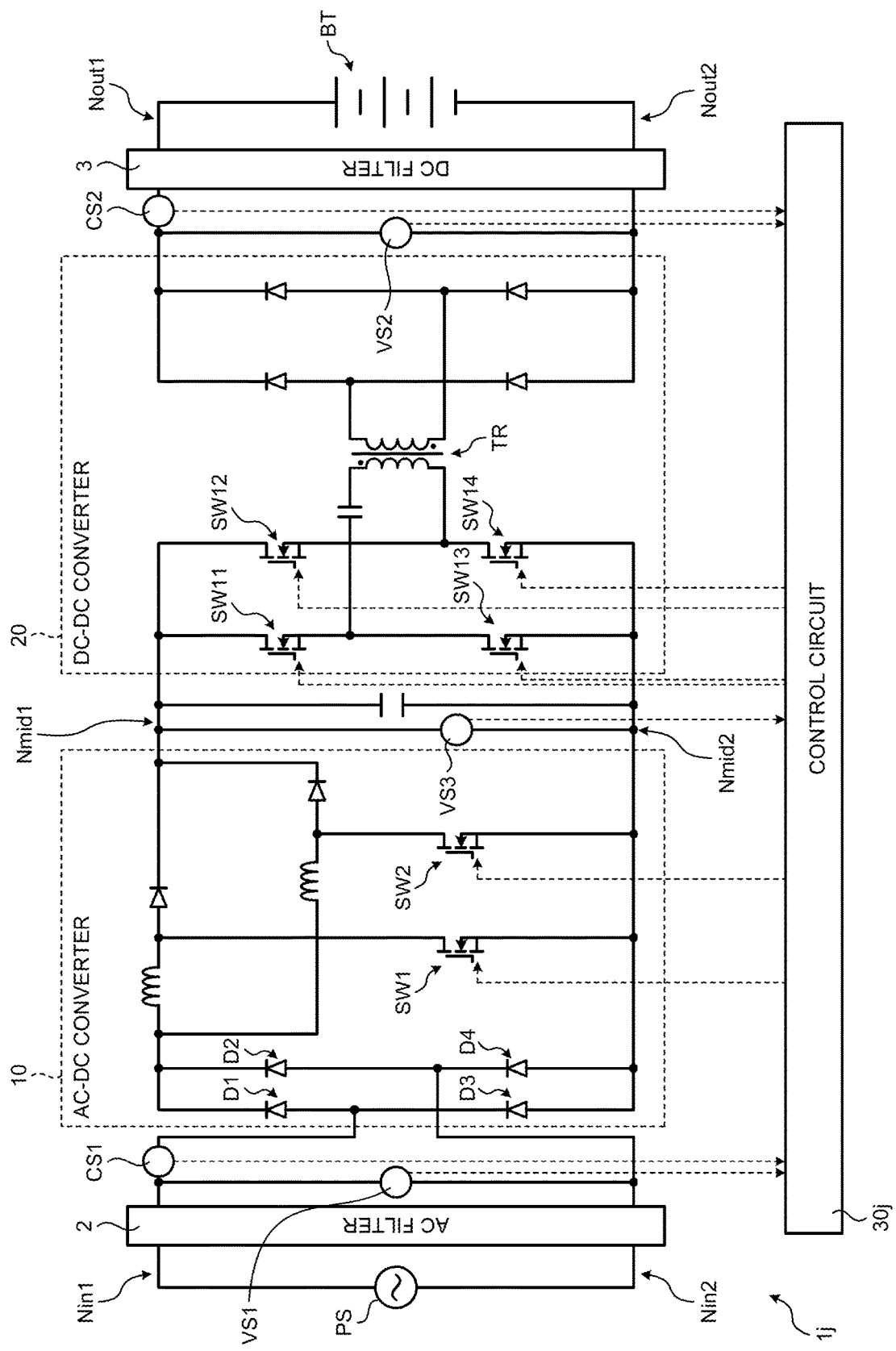
FIG. 8 is a circuit diagram illustrating the configuration of a charging system according to a second modification of the embodiment.

As illustrated in FIG. 8, the charging system 1j does not include the temperature sensor TS1, unlike the charging system 1 (see FIG. 1). FIG. 8 is a circuit diagram illustrating the configuration of the charging system 1j according to a second modification of the embodiment. A control circuit 30j determines power efficiency in accordance with the first parameter and the second parameter and controls the operation of the AC-DC converter 10 in the direction in which the power efficiency to be determined increases. The control circuit 30j compares power efficiency determined at a first timing with power efficiency determined at a second timing. Based on a result of the comparison, the control circuit 30j determines the direction in which power efficiency increases. The control circuit 30j controls the voltage Vbus in the determined direction. In other words, the control circuit 30*j* controls the operation condition (for example, frequency or pulse width) of the switching elements SW1, SW2 in the AC-DC converter 10 in the direction in which the power efficiency to be determined increases.

Figure 9:
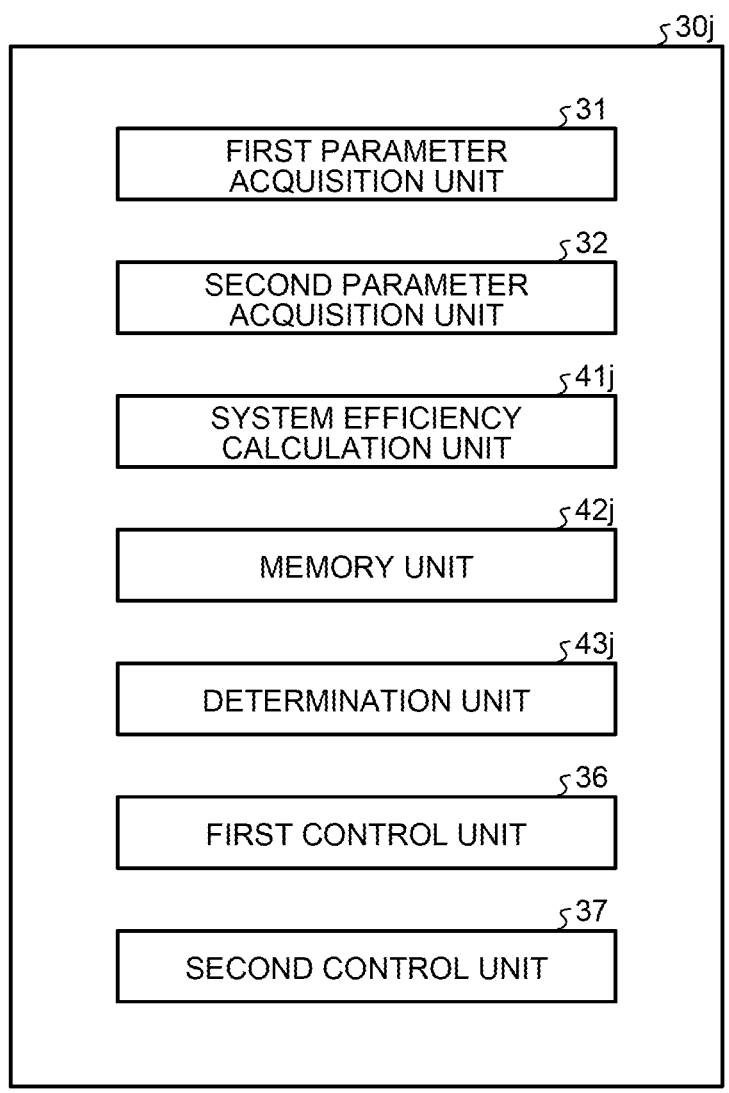
FIG. 9 is a diagram illustrating the functional configuration of a control circuit in the second modification of the embodiment.

The control circuit 30*j* can be configured as illustrated in FIG. 9. FIG. 9 is a diagram illustrating the functional configuration of the control circuit 30*j* in the second modification of the embodiment. The control circuit 30*j* includes a system efficiency calculation unit 41*j*, a memory unit 42*j*, and a determination unit 43*j*, in place of the memory unit 34 and the target voltage determination unit 35 (see FIG. 3), and does not include the third parameter acquisition unit 33.

The first parameter acquisition unit 31 acquires the input current Iin from the current sensor CS1 and acquires the input voltage Vin from the voltage sensor VS1. The first parameter acquisition unit 31 can determine an input power PWin as the first parameter by using the following Equation 2.

$$PWin = Iin \times Vin \qquad \text{Equation 2}$$

The second parameter acquisition unit 32 acquires the output current Iout from the current sensor CS2 and acquires the output voltage Vout from the voltage sensor VS2. The second parameter acquisition unit 32 can determine an output power PWout as the second parameter by using the following Equation 3.

$$PWout = Iout \times Vout \qquad \text{Equation 3}$$

When the first parameter and the second parameter are determined by using Equation 2 and Equation 3, respectively, the system efficiency calculation unit 41*j* can determine power efficiency R of the charging system 1*j* by the following Equation 4.

$$R = (PWout)/(PWin) \qquad \text{Equation 4}$$

The memory unit 42*j* stores the determined power efficiency R while associating the determined power efficiency R with the timing of the determination. The determination unit 43*j* compares power efficiency determined at the first timing with power efficiency determined at the second timing. The determination unit 43*j* determines which direction leads to higher power efficiency, as for each of the operation condition (for example, frequency or pulse width) of the switching elements SW1, SW2 and the operation condition of the switching elements SW11 to SW14, based on a result of the comparison. The determination unit 43*j* supplies a result of the determination to the first control unit 36 and the second control unit 37. In response to the determination result, the first control unit 36 adjusts the operation condition so as to increase the power efficiency, and causes the switching elements SW1, SW2 to perform switching operation. The second control unit 37 adjusts the operation condition so as to increase the power efficiency, and causes the switching elements SW11 to SW14 to perform switching operation.

Figure 10:
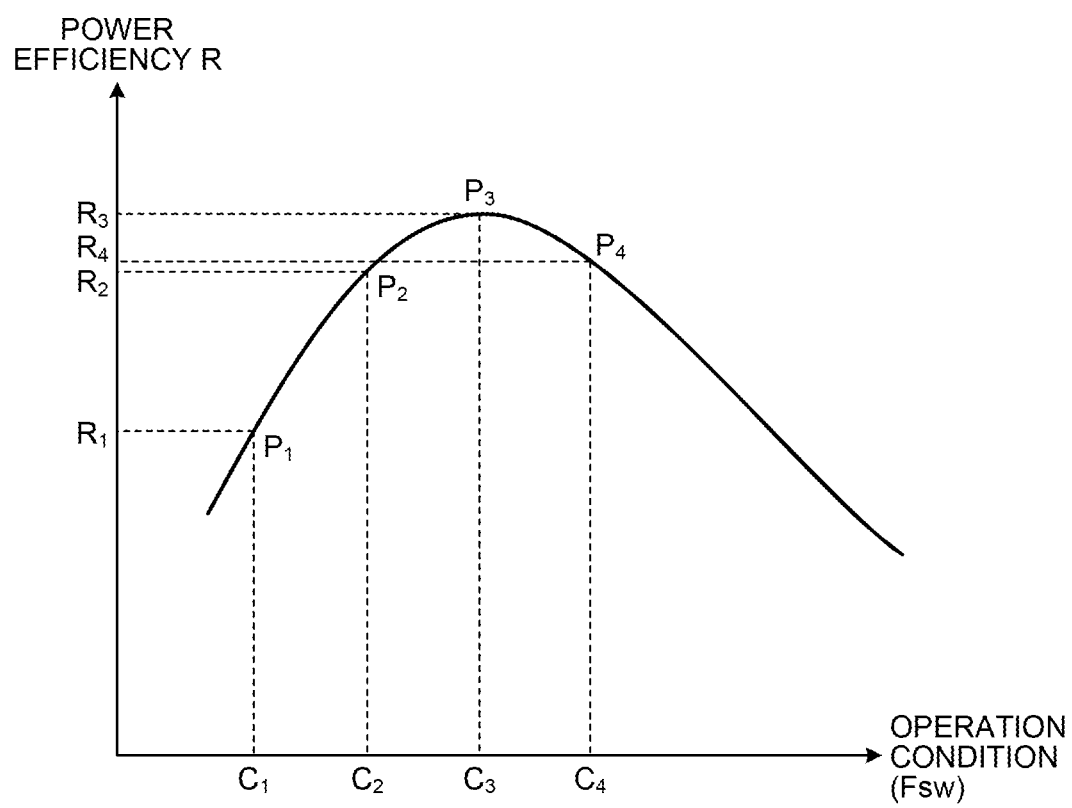
FIG. 10 is a diagram illustrating an operation of the control circuit in the second modification of the embodiment.

For example, the control circuit 30*j* may search for the maximum point of the power efficiency R by using the hill-climbing method, as illustrated in FIG. 10. FIG. 10 is a diagram illustrating the operation of the control circuit 30*j* in the second modification of the embodiment.

At a timing t1, in a state in which the switching elements SW1, SW2, SW11 to SW14 are operating under the operation condition C1, power efficiency R1 is determined by the system efficiency calculation unit 41*j*, and a combination P1 (C1, R1) of the operation condition C1 and the power efficiency R1 is stored in the memory unit 42*j*. To search for the maximum point of the power efficiency R, the first control unit 36 and the second control unit 37 increase the operation conditions (for example, frequency Fsw) of the switching elements SW1, SW2, SW11 to SW14 from C1 to C2.

At a timing t2, in a state in which the switching elements are operating under the operation condition C2, power efficiency R2 is determined by the system efficiency calculation unit 41*j* and a combination P2 (C2, R2) of the operation condition C2 and the power efficiency R2 is stored in the memory unit 42*j*. The determination unit 43*j* compares the power efficiency R1 with the power efficiency R2. When a result of the comparison is $$R1 < R2,$$

the determination unit 43*j* determines that the change from C1 to C2 in the increasing direction of the operation condition is the direction in which the power efficiency increases. In response to the determination, the first control unit 36 and the second control unit 37 increase the operation conditions of the switching elements SW1, SW2, SW11 to SW14 from C2 to C3.

At timing t3, in a state in which the switching elements are operating under the operating condition C3, power efficiency R3 is determined by the system efficiency calculation unit 41*j* and a combination P3 (C3, R3) of the operating condition C3 and the power efficiency R3 is stored in the memory unit 42*j*. The determination unit 43*j* compares the power efficiency R2 with the power efficiency R3. When a result of the comparison is $$R2 < R3,$$

the determination unit 43*j* determines that the change from C2 to C3 in the increasing direction of the operation condition is the direction in which the power efficiency increases. In response to the determination, the first control unit 36 and the second control unit 37 increase the operation conditions of the switching elements SW1, SW2, SW11 to SW14 from C3 to C4.

At timing t4, in a state in which the switching elements are operating under the operating condition C4, power efficiency R4 is determined by the system efficiency calculation unit 41*j* and a combination P4 (C4, R4) of the operating condition C3 and the power efficiency R3 is stored in the memory unit 42*j*. The determination unit 43*j* compares the power efficiency R3 with the power efficiency R4. When a result of the comparison is $$R3 > R4,$$

the determination unit 43*j* determines that the change leading to increasing the operation conditions, from C3 to C4, is a change leading to higher power efficiency. In response to the determination, the first control unit 36 and the second control unit 37 return the operation conditions of the switching elements SW1, SW2, SW11 to SW14 from C4 to C3. Thus, the control circuit 30*j* determines that the operation condition C3 is an operation condition leading to approximately the maximum power efficiency, and terminates the search.

Thus, the control circuit 30*j* sequentially determines power efficiency in accordance with the first parameter and the second parameter, and controls the voltage Vbus while conducting a search so as to achieve higher power efficiency (for example, the maximum power efficiency). Thus, a dynamic change can be dealt with and power efficiency can be enhanced on a real-time basis.

Note that the control circuit 30j may calculate power efficiency sequentially (for example, in a predetermined cycle) even during the operation of the circuit and conduct the search.

A range targeted for increasing (for example, maximizing) power efficiency is not limited to the whole of the charging system 1j. For example, the control circuit 30j may conduct a search by the hill-climbing method so as to achieve higher power efficiency (for example, the maximum power efficiency) of the DC-DC converter 20.

Figure 11:
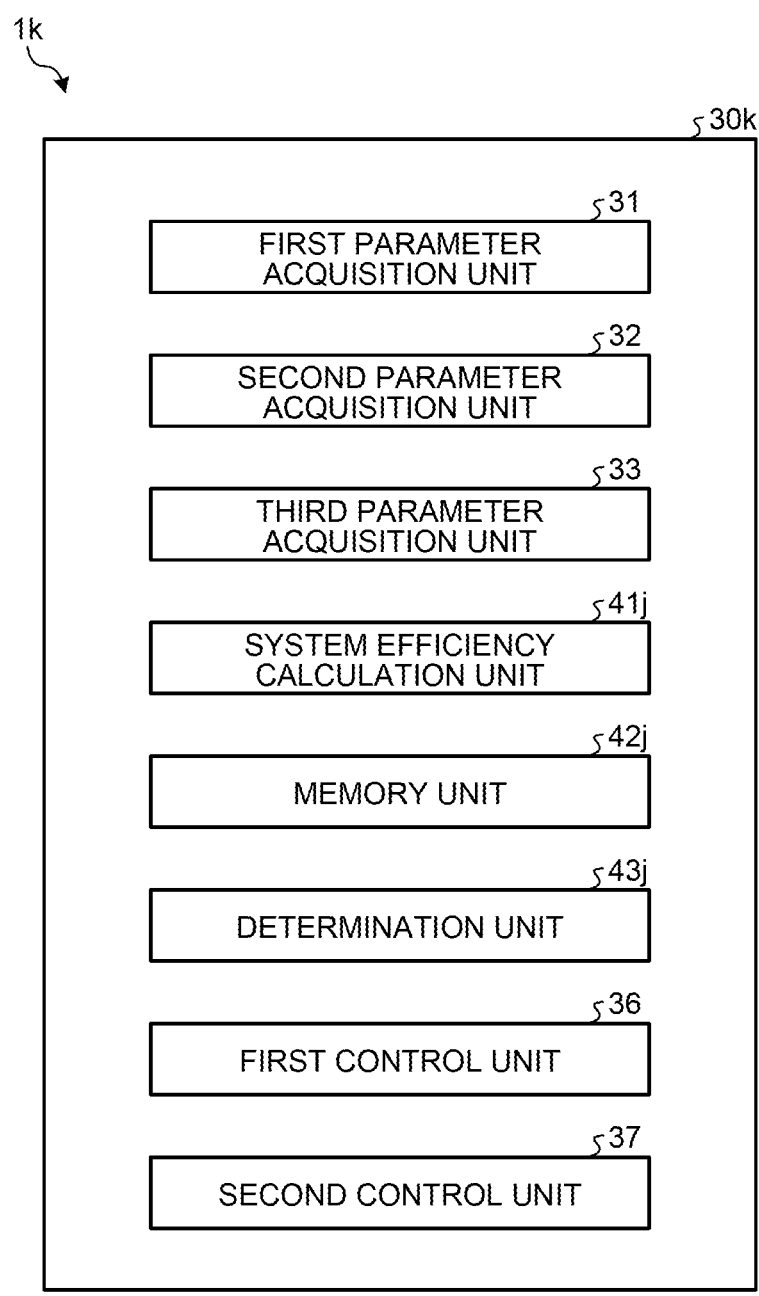
FIG. 11 is a diagram illustrating the functional configuration of a control circuit in a third modification of the embodiment.

Alternatively, as a third modification of the embodiment, a charging system 1k may monitor the first parameter and the second parameter, calculate system efficiency, and dynamically control the voltage Vbus to achieve higher system efficiency (for example, the maximum system efficiency) in consideration of the third parameter. In this case, a control circuit 30k can be configured as illustrated in FIG. 11. FIG. 11 is a diagram illustrating the functional configuration of the control circuit 30k in the third modification of the embodiment. The control circuit 30k includes the system efficiency calculation unit 41j, the memory unit 42j, and the determination unit 43j, in place of the memory unit 34 and the target voltage determination unit 35 (see FIG. 3).

The operation of the system efficiency calculation unit 41j is the same as the operation of the system efficiency calculation unit 41j of the control circuit 30k. The memory unit 42j stores the power efficiency R and the ambient temperature T while associating the power efficiency R and the ambient temperature T with the timing. The determination unit 43j compares power efficiency determined at the first timing with power efficiency determined at the second timing. Based on a result of the comparison and the third parameter, the determination unit 43j determines the direction in which the power efficiency increase, as for each of the operation condition (for example, frequency or pulse width) of the switching elements SW1, SW2 and the operation condition (for example, frequency or pulse width) of the switching elements SW11 to SW14. The determination unit 43j supplies a result of the determination to the first control unit 36 and the second control unit 37. In response to the determination result, the first control unit 36 adjusts the operation condition in the direction in which the power efficiency increases, and causes the switching elements SW1, SW2 to perform switching operation. The second control unit 37 adjusts the operation condition in the direction in which the power efficiency increases, and causes the switching elements SW11 to SW14 to perform switching operation.

Figure 12:
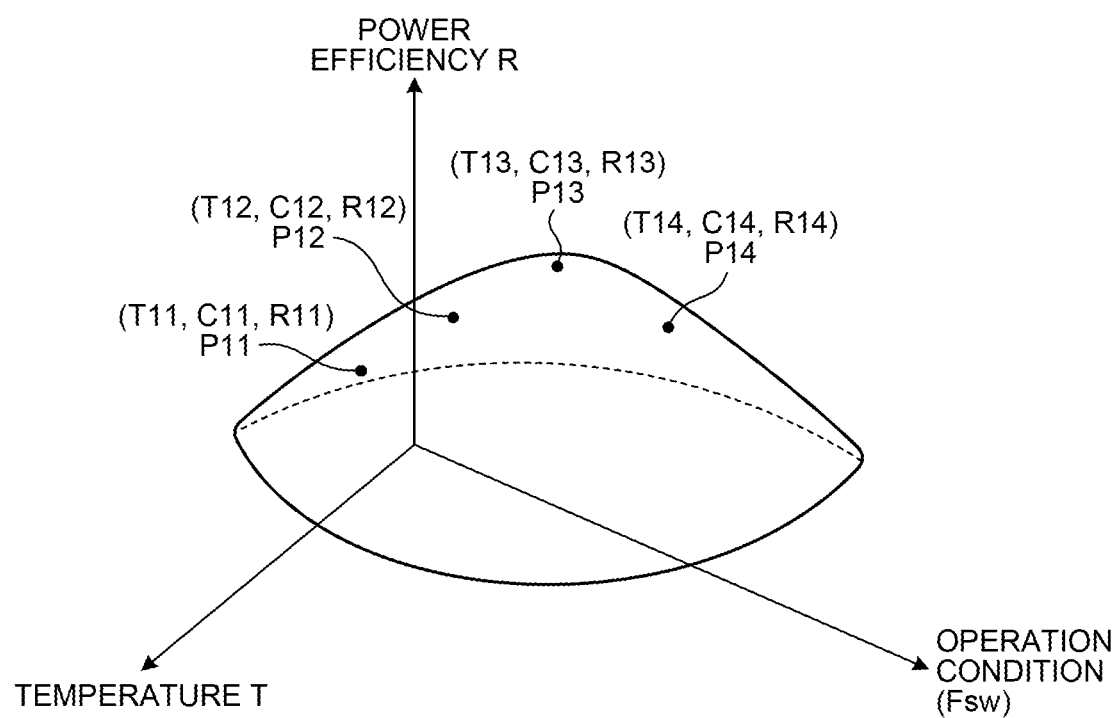
FIG. 12 is a diagram illustrating an operation of the control circuit in the third modification of the embodiment.

For example, the control circuit 30k may search for the maximum point of the power efficiency R by using the hill-climbing method, as illustrated in FIG. 12. FIG. 12 is a diagram illustrating the operation of the control circuit 30k in the third modification of the embodiment.

At a timing t11, in a state in which the switching elements SW1, SW2, SW11 to SW14 are operating under the operation condition C11 at an ambient temperature T11, power efficiency R11 is determined by the system efficiency calculation unit 41j and a combination P11 (T11, C11, R11) of the ambient temperature T11, the operation condition C11, and the power efficiency R11 is stored in the memory unit 42j. To search for the maximum point of the power efficiency R, the first control unit 36 and the second control unit 37 increase the operating conditions (for example, frequency Fsw) of the switching elements SW1, SW2, SW11 to SW14 from C11 to C12.

At a timing T12, in a state in which the switching elements are operating under the operation condition C12, power efficiency R12 is determined by the system efficiency calculation unit 41j, and a combination P12 (T12, C12, R12) of the timing T12, the operation condition C12, and the power efficiency R12 is stored in the memory unit 42j. The determination unit 43j compares the power efficiency R11 with the power efficiency R12. When a result of the comparison is $R11 < R12,$ the determination unit 43j determines that the change from C11 to C12 in the increasing direction of the operation conditions is the direction in which the power efficiency increases, in consideration of the ambient temperature T11. In response to the determination, the first control unit 36 and the second control unit 37 increase the operation conditions of the switching elements SW1, SW2, SW11 to SW14 from C12 to C13.

At a timing T13, in a state in which the switching elements are operating under the operation condition C13, power efficiency R13 is determined by the system efficiency calculation unit 41j, and a combination P13 (T13, C13, R13) of the timing T13, the operation condition C13, and the power efficiency R13 is stored in the memory unit 42j. The determination unit 43j compares the power efficiency R12 with the power efficiency R13. When a result of the comparison is $R12 < R13,$ the determination unit 43j determines that the change from C12 to C13 in the increasing direction of the operation condition is the direction in which the power efficiency increases, with consideration of the ambient temperature T11. In response to the determination, the first control unit 36 and the second control unit 37 increase the operation conditions of the switching elements SW1, SW2, SW11 to SW14 from C13 to C14.

At a timing T14, in a state in which the switching elements are operating under the operation condition C14, power efficiency R14 is determined by the system efficiency calculation unit 41j, and a combination P14 (T14, C14, R14) of the timing T14, the operation condition C14, and the power efficiency R14 is stored in the memory unit 42j. The determination unit 43j compares the power efficiency R13 with the power efficiency R14. When a result of the comparison is $R13 > R14,$ the determination unit 43j determines that the change from C13 to C14 in the increasing direction of the operation conditions is the direction in which the power efficiency increase. In response to the determination, the first control unit 36 and the second control unit 37 return the operation conditions of the switching elements SW1, SW2, SW11 to SW14 from C14 to C13. In response to the determination, the first control unit 36 and the second control unit 37 return the operation conditions of the switching elements SW1, SW2, SW11 to SW14 from C14 to C13. Thus, the control circuit 30k determines that the operation condition C13 is an operation condition leading to approximately the maximum power efficiency, and terminates the search.

Thus, the control circuit 30k sequentially determines power efficiency in accordance with the third parameter in addition to the first parameter and the second parameter, and controls the voltage Vbus while conducting a search so as to achieve higher power efficiency (for example, the maximum power efficiency). Thus, a dynamic change can be more appropriately dealt with and power efficiency can be further enhanced on a real-time basis.

According to the charging system of the present disclosure, a power loss can be substantially prevented.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A charging system comprising:
an AC-DC converter connected between an input node and an intermediate node and connectable to a power source via the input node;
a DC-DC converter connected between the intermediate node and an output node and connectable to a battery via the output node; and
a control circuit configured to control a voltage of the intermediate node so as to reduce a sum of a loss in the AC-DC converter and a loss in the DC-DC converter, in accordance with a first parameter related to input power of the AC-DC converter, and a second parameter related to output power of the DC-DC converter,
wherein the control circuit is configured to control the voltage of the intermediate node so as to reduce the sum of the loss in the AC-DC converter and the loss in the DC-DC converter, in accordance with a third parameter related to an ambient temperature, and
wherein the ambient temperature is a temperature of a switching element or a temperature of a rectifier.

2. The charging system according to claim 1, wherein the control circuit is configured to determine a target value of the voltage of the intermediate node so as to reduce the sum of the loss in the AC-DC converter and the loss in the DC-DC converter, and control an operation condition of a switching element in the AC-DC converter such that the voltage of the intermediate node reaches the target value.

3. The charging system according to claim 1, wherein
the control circuit has correspondence information in which the first parameter, the second parameter, the third parameter, the sum, and the voltage of the intermediate node are associated with a plurality of voltages of the intermediate node,
the control circuit is configured to acquire the first parameter, the second parameter, and the third parameter, and, when the sum corresponding to the acquired first parameter, the acquired second parameter, and, when the acquired third parameter in the correspondence information includes a plurality of sums, determine a smaller sum of the loss in the AC-DC converter and the loss in the DC-DC converter among the plurality of sums, to be a target value, and
the control circuit is configured to control the switching element in the AC-DC converter such that the voltage of the intermediate node reaches the target value.

4. A charging system comprising:
an AC-DC converter connected between an input node and an intermediate node and connectable to a power source via the input node;
a DC-DC converter connected between the intermediate node and an output node and connectable to a battery via the output node; and
a control circuit configured to control a voltage of the intermediate node so as to reduce a sum of a loss in the AC-DC converter and a loss in the DC-DC converter, in accordance with a first parameter related to input power of the AC-DC converter, and a second parameter related to output power of the DC-DC converter,
wherein the control circuit configured to control the voltage of the intermediate node so as to reduce the sum of the loss in the AC-DC converter and the loss in the DC-DC converter, in accordance with a third parameter related to an ambient temperature, and
wherein the ambient temperature is one of the temperatures of a switching element, vicinity of the switching element, a rectifier or and vicinity of the rectifier.

* * * * *